United States Patent [19]
Albers et al.

[11] Patent Number: 5,928,496
[45] Date of Patent: Jul. 27, 1999

[54] HYDROTALCITE SULFER OXIDE SORPTION

[75] Inventors: Edwin W. Albers, Severna Park; Harry W. Burkhead, Jr., Baltimore, both of Md.

[73] Assignee: Contract Materials Processing, Inc., Baltimore, Md.

[21] Appl. No.: 08/874,511

[22] Filed: Jun. 13, 1997

Related U.S. Application Data

[60] Provisional application No. 60/020,126, Jun. 20, 1996.
[51] Int. Cl.⁶ .............................. B01D 53/02; B01J 8/00; C10G 11/00
[52] U.S. Cl. .......................... 208/113; 208/299; 208/300; 423/242.1; 423/244.01; 423/244.02; 423/244.06; 423/244.09; 423/244.1; 95/135; 95/137
[58] Field of Search ................................ 208/208 R, 244, 208/250, 299, 300, 113; 423/242.1, 242.2, 244.01, 244.02, 244.06, 244.09, 244.1; 95/135, 137

[56] References Cited

U.S. PATENT DOCUMENTS

| | | | |
|---|---|---|---|
| 4,889,615 | 12/1989 | Chin et al. ............................... | 208/113 |
| 5,079,203 | 1/1992 | Pinnavaia et al. ......................... | 502/84 |
| 5,114,691 | 5/1992 | Pinnavaia et al. ........................ | 423/244 |
| 5,114,898 | 5/1992 | Pinnavaia et al. ........................ | 502/406 |
| 5,116,587 | 5/1992 | Pinnavaia et al. ........................ | 423/244 |
| 5,348,725 | 9/1994 | Misra et al. ............................. | 423/594 |
| 5,358,701 | 10/1994 | Pinnazaia et al. ....................... | 423/242.1 |
| 5,399,329 | 3/1995 | Schultz et al. .......................... | 423/415.1 |
| 5,801,115 | 9/1998 | Albers et al. ............................ | 502/342 |

*Primary Examiner*—Walter D. Griffin
*Attorney, Agent, or Firm*—L Gene Wise

[57] ABSTRACT

Hydrotalcite-like materials are stable in the crystalline oxide structure and essentially reversible in anion exchange. A novel process of sulfur oxide sorption is provided utilizing these hydrotalcite materials as contact solids. Large crystalline sheet materials having increased sorption of $SO_x$ are provided by incorporation of certain organic acid anionic species to modify the hydrotalcite/brucite structure. Typical industrial applications include sulfur removal from fluid catalyst cracking process, cold-side combustion gas sulfur abatement and cleaner coal gasification.

14 Claims, No Drawings

HYDROTALCITE SULFER OXIDE SORPTION

This application claims the benefit of U.S. Provisional application Ser. No. 60/020,126, filed Jun. 20, 1996.

FIELD OF THE INVENTION

The present invention relates to new hydrotalcite sorbents useful in sulfur abatement and novel processes.

BACKGROUND OF THE INVENTION

Industry is lacking a composition such as fluidized bed catalyst or additive contact solids for economically removing sulfur oxides from emissions from a variety of industrial processes. Further, the industry lacks effective and economical methods for using a fluidized bed of particles to remove sulfur oxides from emissions.

Synthetic hydrotalcites, known as layered double hydroxides, are useful as contact solids in numerous industrial processes. In view of a limited supply of naturally-occurring hydrotalcite, various efforts have been made to achieve a reasonably economic alternative material in the form of synthetic Layered Double Hydroxides ['LDH'].

Production of analogous crystalline materials has been fruitful, and it may be expected that important new uses for the class of hydrotalcite crystalline solids will increase industrial demand.

The 'hydrotalcite-like' materials of Schutz et al (U.S. Pat. Nos. 5,399,329 and 5,507,980) are characterized by crystals having very high broadness to thickness ratios in the 50:1 to 5000:1 range. These interesting materials have desirable mechanical and chemical properties, which will render them useful as solids binders or as active chemical sites. Recent efforts in this aspect of layer propagation have identified certain anionic species which contribute to forming the large sheets of synthetic hydrotalcites. The mechanism whereby these lower alkanoic acid anions direct the important plate shape is not understood; however, large plate crystals having a maximum dimension of about 5 to 500 microns ($\mu$) impart excellent mechanical properties.

A structural description of the class of "brucite" crystals is found in the work of Pinnavaia et al (U.S. Pat. No. 5,358,701, incorporated by reference). Briefly, the metal oxide layers consist essentially of magnesium oxide (MgO) configured structurally with octahedral hydroxy groups. A trivalent metal oxide, such as alumina ($Al_2O_3$), can be inserted into the brucite crystalline lattice in the octahedrally-coordinated metal oxide layer. In the case of natural hydrotalcite, the carbonate layer or gallery may be replaced by substitution of various acidic anions, sulfate, sulfite, nitric, etc.

SUMMARY OF THE INVENTION

It has been discovered that incorporation of certain organic acid anionic species can be effective in modifying the hydrotalcite/brucite structure to result in large crystalline sheet materials having increased sorption of $SO_x$. Since hydrotalcite-like materials are stable in the crystalline oxide structure and essentially reversible in anion exchange up to about 400° C., stable sorbent may be employed in moderately elevated industrial processes, such as cold side combustion effluent treatment of fossil fuel burning power plants.

In a preferred embodiment of the invention, a novel process of sulfur oxide sorption is provided, wherein a gas containing sulfur oxide is contacted at process temperature, from about 200° C. up to about 950° C. with a solid sorbent material to remove sulfur oxide from the gas. The improvement comprises utilizing a solid sorbent material comprising at least one layered hydrotalcite sheet having a brucite crystalline structure containing divalent and trivalent metal oxides comprising predominantly magnesia and alumina present in the brucite structure in molar ratio of 3:1 to 8:1 magnesia:alumina, together with a sulfur oxide replaceable anion, the hydrotalcite sheet having a breadth to thickness ration of 50:1 to 5000:1. The amount of hydrotalcite in the solid sorbent can vary from about 10 to 100 wt %.

Sulfur oxide sorption may be enhanced by depositing on the hydrotalcite-containing solid sorbent material an effective amount (eg—50 to 500 ppm) of oxidative metal catalyst, such as platinum. In one embodiment the solid sorbent material comprises at least 10 wt % hydrotalcite and 10 to 50 wt % of a $ZnO:TiO_2$ sorbent mixture.

The invention also includes a process for reducing the amount of SOx emissions passing through a fluidized particle bed.

DETAILED DESCRIPTION OF THE INVENTION

In the following description, units are given as parts by weight and metric units unless otherwise indicated.

Process Applications:—The present invention relates to fluidizable catalysts or contact solids, methods for using such materials to reduce the emissions of sulfur compounds from industrial processes, and methods for preparing such contact solids or catalysts with hydrotalcite.

The conversion, processing or burning of sulfur-containing fossil fuels can result in the emission of sulfur-containing compounds, such as $H_2S$ and SOx, to the atmosphere. To comply with increasingly stringent environmental regulations, materials are sought to reduce the emissions of sulfur compounds from industrial processes. Several methods of desulfurization are currently being used commercially. These methods include flue gas scrubbing as well as various fixed bed, ebullating bed, and fluid bed catalytic reaction processes. Some of these processes treat the flue gas just prior to the release of gas to the atmosphere.

Other processes are performed upstream of the emission release in order to prevent the undesired emission from occurring. The goal of such processes is to reduce emission of sulfur-containing compounds into the atmosphere.

The inventive process reduces the amount of SOx emissions passing through a fluidized particle bed. This process may comprise the step of introducing into the fluid particle bed a microspheroidal catalyst having a composition comprising at least 10 wt % of SOx-capturing hydrotalcite-type metal oxide. Typically, this involves sorbing or capturing $SO_3$ in the fluid particle bed regenerator as an inorganic sulfate in a fluid cracking catalytic operation. In a petroleum refinery SOx emissions are often generated in the fluid cracking catalyst regenerator and released in its flue gas.

A typical sulfur abatement process includes the step of introducing into the fluid particle bed a microspheroidal catalyst having a composition comprising at least one SOx-capturing oxide and at least one inorganic binder. Oxidation of $SO_2$ to $SO_3$ can be achieved employing an oxidation promoter catalytic component in a fluid particle bed, such as FCC regenerator.

The sulfur-laden hydrotalcite crystalline sheet material is a novel composition containing a sulfate anionic crystal moiety having at least 5 weight percent sulfur oxide based on sulfur-free hydrotalcite. The capture of $SO_3$ in the fluid particle bed regenerator as an inorganic sulfate on the SOx-capturing oxide is usually followed by reducing the inorganic sulfate to a sulfide in a fluid particle bed reactor/stripper. Then, the sulfur can be released as $H_2S$ upon hydrogenolysis or reduction in the stripper. Incorporation of a minor amount of a vanadium oxide component in the contact solids promotes reduction of sulfate during regeneration of the hydrotalcite.

The catalyst composition is desirably formed into a fluidizable particle having an average particle size in the range of about 20–300$\mu$ that is useful in both conventional fluidized bed and ebullating bed processes. The SOx-capturing oxide of the invention is desirably a sheet-like hydrotalcite and/or mixed inorganic oxide additive for catalyzing the capture and release of sulfur-containing compounds in the fluid cracking catalyst provides refiners with an effective means for reducing fluid cracking catalyst SOx emissions. The invention provides a contact solid or catalyst composition employed as a formed spheroidal catalyst that reduces the emissions of sulfur containing compounds from industrial processes.

For example, in the preferred embodiment of the invention, the hydrotalcite captures and thereby removes the sulfur containing species, such as $H_2S$ or SOx that is present in the gas stream being treated.

The hydrotalcite composition may include a combination of inorganic oxides with an inorganic binder, an organic binder, or a mixtures of an inorganic and organic binder. Desirable inorganic oxides include a member selected from the group consisting of oxides or hydroxides of aluminum, calcium, cobalt, copper, iron, magnesium, molybdenum, silicon, titanium, vanadium, zinc, tungsten, strontium, nickel, manganese, zirconium, barium, members of the lanthanide series and mixtures thereof.

The contact solid composition may be self-bound or may include a binder component to "glue" the inorganic oxides together into the desired shape, such as spheroidal particles. Depending on the application, different binding systems are used. For example, in more severe high temperature applications such as fluid cracking catalyst (eg—700–820° C.), a hydrothermally stable inorganic binder such as aluminum chlorohydrol or peptized alumina is used.

Effective inorganic binders include sols of aluminum such as aluminum chlorohydrol, peptized aluminas, sols of silica, colloidal silicas, sols of titanium, sols of zirconium clays such as bentonite, calcined kaolinite, kaolinite, metakaolin, montmorillonite, chlorite, talc, and mixtures of these. Desirable inorganic binders include a sol of aluminum, peptized alumina, a sol of silica, colloidal silica, a sol of titanium, a sol of zirconium, a clay, and mixtures thereof.

The smectite clays are especially desirable alone or in combination with zinc oxide/titania mixtures, various inorganic binders and smectite. In some applications, such as a fluidized or ebullating bed, found in many flue gas desulfurization units, an organic binder such as hydroxypropyl methyl cellulose or polyvinyl alcohol is used.

Other components can be added to the catalyst composition to enhance the performance of conversion catalyst in specific applications or for a specific set of operating conditions. An oxidation promoter such as platinum or cerium can be added to the catalyst solids to facilitate the oxidation of $SO_2$ to $SO_3$, for instance in the fluid cracking catalyst regenerator, thus improving the overall performance of the catalyst. Desirable additional components can include any number of activators, promoters oxidizers, reducers, scavengers, and mixtures of these components. These materials may enhance performance. The solid composition preferably is prepared in the form of a spheroidal particle of about 1 to 10,000 microns diameter.

Advantageously, this invention is employed to reduce emissions of sulfur compounds from a fluid cracking catalyst (FCC) process. Particulate solids are added to the FCC unit in the same manner as the conventional cracking catalyst (eg—REY zeolite). The hydrotalcite additive can be introduced separately or together in a mixture with the cracking catalyst. Usually the addition is accomplished by a pneumatic conveying system to blow the material directly into the FCC catalyst regenerator. The catalyst additive then circulates through the fluid cracking catalyst unit in direct contact and along with the fluid cracking catalyst. The quantity of fluid cracking catalyst additive that is added and which then circulates in the unit is sufficient to effectively reduce the emissions of sulfur containing compounds from the FCC unit, yet it need not be present in a proportion so large that it deleteriously affects the operation of the cracking process reactions. Fluid cracking catalyst additive level of between about 0.5 and about 10 weight percent of the circulating fluid cracking catalyst inventory is desirable.

In the coal gasification process, the flue gas or hot gas is passed through a fluidized or ebullating bed of catalyst to remove sulfur compounds.

Industrial processes for sulfur oxide abatement may be conducted at various temperatures. Whereas cold side flue gas abatement may be carried out advantageously at about 200 to 400° C., more elevated temperatures in the 400 to 700° C. range may be employed. FCC processes may employ the hydrotalcite sorbents at 700 to 820° C. or higher temperature, as will be understood by the skilled chemical engineer.

Synthesis Methods: A preferred method of manufacturing hydrotalcite-like materials having a sheet morphology is disclosed by Schutz et al in U.S. Pat. Nos. 5,399,329 and 5,507,980, incorporated herein by reference. These materials may be synthesized from an aqueous slurry of pseudoboehmite and magnesia in the presence of C1–C6 lower monocarboxylic acid, such as acetic acid. The coprecipitated crystalline sheet materials have a very high breadth:thickness ratio, eg—50:1 to 5000:1.

The process of sulfur oxide sorption is preferably carried out by a hydrotalcite having the following formula, as synthesized:

$$Mg_{1-x}Al_x(OH)_2 \cdot xA \cdot mH_2O;$$

where A is a lower monocarboxylic anion, x is 0.2 to 0.4, and m is 0 to 4.

Divalent Mg may be substituted in the brucite crystalline structure up to 50 mol % by other divalent metal cation, such as Ni, Cu, Zn, Co and/or Mn; and Al ion may be substituted in the brucite crystalline structure up to 50 mol % by trivalent metal cation, such as Cr and/or Fe.

Sulfur oxide sorption may be enhanced by depositing on the hydrotalcite-containing solid sorbent material an effective amount (eg—50 to 500 ppm. Pt) of oxidative metal catalyst, such as platinum, palladium, cerium, etc. This is believed to permit sulfur dioxide to be oxidized to sulfur trioxide to provide a sulfate ion in the sorbent lattice as a 'gallery layer' anion.

Sulfur Oxide Sorption

It is understood that hydrotalcite crystalline material may have up to four moles of water bound to the ideal formula unit moiety of the crystals. Accordingly, there is a significant weight decrease when water of hydration is lost during heating to about 200–400° C.

It is known that natural hydrotalcite and other LDH materials are sorbents for sulfur dioxide ($SO_2$) and sulfur trioxide ($SO_3$), collectively—"$SO_x$". According to Pinnavaia et al (U.S. Pat. No. 5,358,701), these sulfur oxides can replace the carbonate anion moiety or other anions in the brucite lattice in the temperature range of 100° C. to 400° C. A standard test method for measuring such sorption characteristics is thermogravimetric analysis (TgA), wherein a test sample of the crystalline solid material is heated at predetermined rate to 700° C., releasing water of hydration. A gaseous stream containing the sulfur oxide is then contacted with the sample and weight of sorbed material is measured. Regeneration of the sorbent (ie—by reduction of sulfate to sulfite) can be effected by passing a hot gas, such as hydrogen over the sample.

In the following examples, various contact solids test by TgA for comparing $SO_x$ sorption in a controlled heating, sorption and regeneration cycle. A standard duPont TgA unit is employed to test samples in the TgA ramp method. The sample is heated at uniform rate to 700° C. with a flowing stream of nitrogen through the sample. The sorption cycle employs 3000 ppm. $SO_2$ in a carrier gas stream containing 3 wt % oxygen and balance nitrogen and maintains the sample at predetermined temperature of 700° C. for at least 30 minutes during sulfur oxide sorption. Regeneration is performed by hot hydrogen gas flowing over the sample at 650° C.

EXAMPLE 1

A mixed hydrotalcite-Pt contact solid is tested by standard TgA method. The sheet-type hydrotalcite component (invention) comprises LaRoche HTC powder having a particle size range of about 4 to 90 microns (predominantly 15–40 microns), produced by the method of U.S. Pat. No. 5,399,329. The hydrotalcite powder is blended with equal parts of spheroidal oxidation catalyst component containing 550 ppm Pt on alumina substrate to provide a 50:50 admixture having average 225 ppm. Pt, based on total sample. $SO_x$ sorption peaks at 17 weight percent (based on HTC) in 35 minutes and is released slowly during regeneration.

EXAMPLE 2

A comparative sample material is employed containing 'DESOX' spinel ($MgAl_2O_4$), a standard commercial desulfurization solid having 225 ppm. Pt deposited thereon. The procedure of Example 1 is repeated employing the standard sample.

EXAMPLE 3

An unmodified hydrotalcite powder sample as in Example 1 is tested for SOx sorption without Pt catalyst.

EXAMPLE 4

A zinc oxide/titanium dioxide mixture having a 1.5:1 $ZnO:TiO_2$ wt.ratio (35 wt %) is blended with 10 wt % hydrotalcite powder as in Example 1, 15 wt % talc and 40 wt % fine kaolin clay.

TABLE I

| Ex. No. | Description of Material(s) | Results |
| --- | --- | --- |
| 1 | Hydrotalcite + Pt | 17% pick-up |
| 2 | Spinel + Pt (WR Grace DESOX) | 17% pick-up |
| 3 | Hydrotalcite (LaRoche HTC/ex. 1) | <1% pick-up |
| 4 | $ZnO:TiO_2$ + HTC + talc + kaolin | 9% pickup |

Improved oxidation/sorption performance may be obtained by incorporating the Pt component directly onto the hydrotalcite-containing particles. Cerium and vanadium oxide are also suitable oxidization/reduction components.

In one aspect, this invention includes processes for producing the hydrotalcite solids. Typical methods include spray drying to make small (eg—20–300µ) microspheroidal particles and beading or tumbling processes to make larger spheroidal particles.

While the invention has been shown by particular examples, there is no intent to limit the inventive concept, except as set forth in the following claims.

We claim:

1. In the process of sulfur oxide sorption wherein a gas containing sulfur trioxide is contacted at elevated process temperature with a solid sorbent material to remove sulfur oxide from the gas, the improvement which comprises:

contacting the sulfur oxide containing gas with a fluidizable particulate solid sorbent material having an average particle size of 20 to 300 microns and comprising at least one layered hydrotalcite crystalline sheet having a brucite crystalline structure containing divalent and trivalent metal oxides comprising predominantly magnesia and alumina present in the brucite structure in molar ratio of 3:1 to 8:1 magnesia:alumina, together with a sulfur oxide replaceable anion, said hydrotalcite crystalline sheet having a breadth to thickness ratio of 50:1 to 5000:1.

2. The process of sulfur oxide sorption according to claim 1 wherein said solid sorbent material has deposited thereon an effective amount of oxidative metal catalyst.

3. The process of sulfur oxide sorption according to claim 1 wherein said hydrotalcite, as synthesized, has the formula:

$Mg_{1-x}Al_x(OH)_2 xA \cdot mH_2O$;

where A is a lower monocarboxylic anion, x is 0.2 to 0.4, and m is 0 to 4.

4. The process of sulfur oxide sorption according to claim 3 wherein Mg is substituted in the brucite crystalline structure up to 50 mol % of the Mg by divalent metal cation; wherein A is acetate ion; and wherein Al is substituted in the brucite crystalline structure up to 50 mol % by trivalent Cr or Fe metal cation.

5. In the process of cracking a heavy hydrocarbon feed stock containing sulfur compounds, wherein a gas phase containing sulfur oxide is contacted at process temperature in the range of 700 to 820° C. with a solid sorbent material to remove sulfur oxide from the gas, the improvement wherein: said solid sorbent material comprises a fluidized bed of regenerable particulate sorbent material having an average particle size of 20 to 300 microns and having at least one layered hydrotalcite sheet having a brucite crystalline structure containing divalent and trivalent metal oxides comprising predominantly magnesia and alumina present in the brucite structure in molar ratio of 3:1 to 8:1 magnesia:alumina, together with a sulfur oxide replaceable anion, said hydrotalcite sheet having a breadth to thickness ratio of 50:1 to 5000:1.

6. A process for sulfur dioxide abatement comprising:

contacting a gaseous body containing sulfur dioxide at elevated process temperature with a fluidizable particulate solid sorbent material in the presence of an oxidation metal catalyst to remove sulfur dioxide from the gas; said solid sorbent material comprising at least one layered hydrotalcite sheet having a brucite crystalline structure containing divalent and trivalent metal oxides comprising predominantly magnesia and alumina present in the brucite structure in molar ratio of 3:1 to 8:1 magnesia:alumina, together with a sulfur oxide replaceable anion, said hydrotalcite sheet having a breadth to thickness ratio of 50:1 to 5000:1; and regenerating the sorbent material to release sulfur oxide.

7. The process of claim 6 for sulfur dioxide abatement wherein the gaseous body includes a vapor phase in the fluidized bed cracking of hydrocarbons; and wherein sulfur dioxide is formed and then converted at elevated process temperature of about 700 to 820° C., with said solid sorbent material having an oxidation metal comprising platinum or cerium to convert sulfur dioxide to sulfur trioxide, wherein the sulfur trioxide is captured by the hydrotalcite as gallery sulfate anion.

8. The process of claim 6 for sulfur dioxide abatement wherein the gaseous body is a coal combustion effluent stream; and wherein sulfur dioxide is converted to sulfur trioxide with an oxidation promoter at temperature of about 200 to 400° C.

9. The process of claim 8 wherein the solid sorbent material has deposited thereon an oxidation metal, and wherein sulfur trioxide is sorbed as sulfate anion.

10. The process of claim 9 wherein sulfur trioxide laden hydrotalcite is regenerated by reduction of sulfate to sulfide.

11. The process of claim 6 wherein the solid sorbent material comprises at least 10 wt % hydrotalcite and 10 to 50 wt % of a ZnO and TiO$_2$ mixture.

12. In the process of sulfur oxide sorption wherein a gas containing sulfur oxide is contacted at elevated process temperature with a solid sorbent material to remove sulfur oxide from the gas, the improvement which comprises contacting the sulfur oxide containing gas with a bed of fluidizable solid sorbent particulate material having an average particle size in the range of 20–300 microns and comprising:

(a) at least 10 weight percent of a layered crystalline hydrotalcite having a brucite crystalline structure containing divalent and trivalent metal oxides comprising predominantly magnesia and alumina present in the brucite structure in molar ratio of 3:1 to 8:1 magnesia:alumina, together with a sulfur oxide replaceable anion, said hydrotalcite crystalline sheet having a breadth to thickness ratio of 50:1 to 5000:1;

inorganic oxide including talc and 10 to 50 wt % of a zinc oxide and titanium dioxide sorbent mixture.

13. The process of claim 12 wherein the particulate material contains about 10 wt % hydrotalcite, about 15 wt % talc, about 35 wt % of a mixture of zinc oxide and titanium dioxide in the weight ratio of about 1.5:1.

14. The process of claim 12 wherein the particulate material is substantially free of oxidative metal catalyst and wherein the inorganic oxide includes talc, kaolin, and a mixture ZnO and TiO$_2$ in a ratio of about 1.5:1.

* * * * *